(12) United States Patent
Schönfeld et al.

(10) Patent No.: US 8,783,731 B2
(45) Date of Patent: Jul. 22, 2014

(54) CONNECTING ARRANGEMENT

(71) Applicant: Lincoln GmbH, Walldorf (DE)

(72) Inventors: Andreas Schönfeld, St. Leon-Rot (DE); Daniel Beisel, Kronau (DE)

(73) Assignee: Lincoln GmbH, Walldorf (DE)

( * ) Notice: Subject to any disclaimer, the term of this patent is extended or adjusted under 35 U.S.C. 154(b) by 0 days.

(21) Appl. No.: 13/624,164

(22) Filed: Sep. 21, 2012

(65) Prior Publication Data

US 2013/0076023 A1 Mar. 28, 2013
US 2014/0070528 A2 Mar. 13, 2014

(30) Foreign Application Priority Data

Sep. 23, 2011 (DE) .................... 20 2011 106 039 U

(51) Int. Cl.
   *F16L 33/00* (2006.01)
(52) U.S. Cl.
   USPC ............................ 285/249; 285/343; 285/115
(58) Field of Classification Search
   USPC ......... 285/245, 251, 249, 342, 343, 247, 248, 285/115
   See application file for complete search history.

(56) References Cited

U.S. PATENT DOCUMENTS

| 2,179,200 | A | * | 11/1939 | Scholtes | 285/343 |
| 2,328,298 | A | * | 8/1943 | Santhoff | 285/249 |
| 2,462,323 | A | * | 2/1949 | Hurst | 285/342 |
| 2,476,480 | A | * | 7/1949 | Burckle et al. | 285/245 |
| 2,809,056 | A | * | 10/1957 | Kaiser | 285/248 |
| 2,858,147 | A | * | 10/1958 | Guarnaschelli | 285/251 |
| 2,878,039 | A | * | 3/1959 | Hoegee et al. | 285/249 |
| 3,083,989 | A |   | 4/1963 | Irving |  |
| 3,140,106 | A | * | 7/1964 | Thomas et al. | 285/248 |
| 3,306,637 | A | * | 2/1967 | Press et al. | 285/249 |
| 3,877,734 | A | * | 4/1975 | Brozek | 285/249 |
| 4,063,757 | A | * | 12/1977 | Fuhrmann | 285/251 |
| 5,449,205 | A | * | 9/1995 | Silletti et al. | 285/249 |
| 6,102,449 | A | * | 8/2000 | Welsh | 285/342 |
| 7,661,722 | B2 | * | 2/2010 | Tarquini et al. | 285/249 |
| 8,083,266 | B2 | * | 12/2011 | Tarquini et al. | 285/249 |

FOREIGN PATENT DOCUMENTS

| EP | 0152723 A1 | 8/1985 |
| EP | 1020675 A1 | 7/2000 |
| FR | 75789 | 8/1961 |
| GB | 915 015 A | 1/1963 |

OTHER PUBLICATIONS

German Search Report for Application No. 20 2011 106 039.3 dated Mar. 12, 2012, 2 pages.
European Search Report in application EP 2 573 440 A3 dated Mar. 20, 2014, 3 pages.

* cited by examiner

*Primary Examiner* — David E Bochna
(74) *Attorney, Agent, or Firm* — Senniger Powers LLP

(57) ABSTRACT

A connecting arrangement for connecting a high-pressure hose to a connector. The arrangement features a hollow hose nipple that can be at least sectionally inserted into the hose. A screw sleeve that sectionally encompasses the high-pressure hose can be arranged on the hose nipple. The hose nipple is fluidically connected to the connector and can be connected to the connector by a union nut.

8 Claims, 1 Drawing Sheet

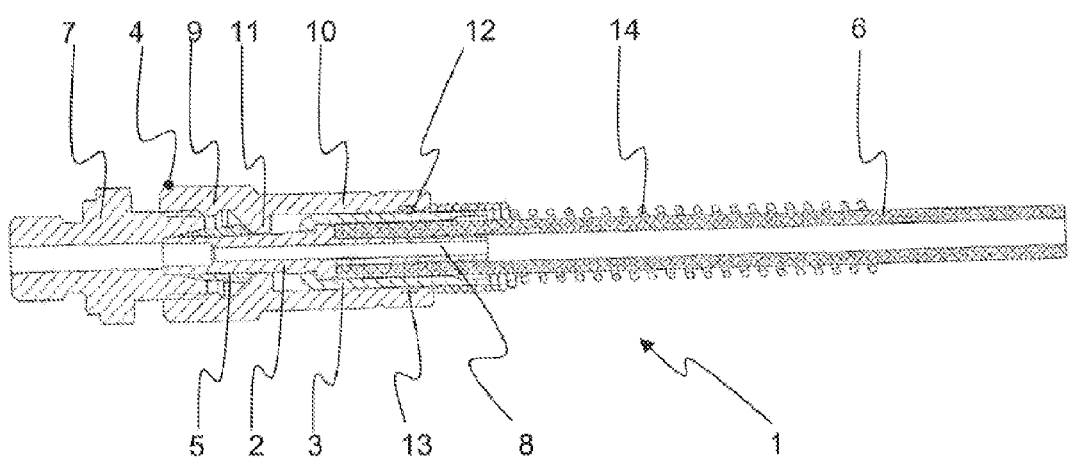

CONNECTING ARRANGEMENT

FIELD OF INVENTION

The invention pertains to a connecting arrangement for connecting a hose, particularly a high-pressure hose for fluids, to a connector. The connecting arrangement features a hollow hose nipple that can be at least sectionally inserted into the hose. A screw sleeve that sectionally encompasses the hose can be arranged on the hose nipple. The hose nipple is fluidically connected to the connector and can be connected to the connector by means of a union nut.

BACKGROUND OF THE INVENTION

Connecting arrangements of this type are used for connecting flexible high-pressure hoses, for example, to a connector of a high-pressure pump. In this case, the hose transports a medium to an end device, wherein the medium is under high pressure. For example, hydraulic oil can be transported to a hydraulic hammer.

It was determined that known connecting arrangements on high-pressure hoses are susceptible to ruptures. This is caused by the extreme demands in the high-pressure range. On the one hand, the medium to be transported is under extremely high pressure and the connecting arrangement is, on the other hand, subjected to strong vibrations as they occur, for example, with hydraulic hammers during operation. Another problem can be seen in that the position of high-pressure hoses is frequently changed by the user because they are normally used as supply lines for movable end devices.

SUMMARY OF THE INVENTION

In summary, this leads to high mechanical stresses of the individual components. It was determined that the weak points consist, in particular, of the non-flexible components. This essentially concerns, in particular, the region between the permanently installed connector side and the flexible hose side of the connection.

The required separable design of the connection between the hose and the connector represents another technical challenge. It further needs to be taken into account that the inside diameter and the outside diameter of the hollow hose nipple influence important properties of the connecting arrangement. The inside diameter influences the flow characteristics such that a reinforcement of the connecting arrangement that would lead to a reduced inside diameter would also undesirably increase the flow resistance. On the other hand, an increased outside diameter results in an increased mass, wherein this increased mass also causes an increase in the vibrational force that likewise should be avoided.

The present invention therefore is based on the objective of making available a rupture-proof yet separable connecting arrangement that does not negatively influence the flow characteristics of the medium to be transported or increase the vibrational forces in the connection.

This objective is attained with a connecting arrangement according to claim 1. The invention is based on the notion of providing a specially shaped union nut that also at least sectionally encompasses the screw sleeve. Due to this measure, the mechanical forces introduced into the connecting arrangement via the hose are not only absorbed and transmitted by the hose nipple, but also by the union nut. This additional non-positive connection significantly reduces the susceptibility of the hose nipple to ruptures without having to change its inside diameter or outside diameter. In this way, it is ensured that the flow characteristics of the medium being transported are not changed. This makes it possible to implement the inventive connecting arrangement without having to modify the pump system or influencing the flow characteristics of the medium.

In a particularly preferred embodiment, the union nut features a first sleeve section with an internal thread, by means of which it can be connected to the connector. An inwardly directed collar that is supported on the hose nipple is arranged on the end of this first sleeve section. The collar transforms into another sleeve section that engages on the screw sleeve. In comparison with a conventional union nut, the union nut is in other words extended by an additional sleeve section in a direction that points away from the first sleeve section with the internal thread. Due to this special construction of the union nut, another non-positive connection between the connector and the hydraulic hose is produced in addition to the hose nipple. In this way, load peaks are also absorbed and transmitted by the union nut. Such load peaks occur, for example, during movements of the hose in the hose nipple, but also due to vibrations of the end device.

The union nut may be realized in such a way that the first sleeve section and the additional sleeve section are approximately aligned with one another or transform into one another with approximately identical diameters, respectively. In this case, the collar is realized in the form of an inwardly protruding flange. However, the additional sleeve section may also have a diameter that differs from the diameter of the first sleeve section, for example, in order to be adapted to the outside contour of the screw sleeve.

In another embodiment, the collar is shaped such that it is conically tapered in the direction of the center of the union nut. This saves material such that the vibrational forces in the connecting arrangement are reduced. However, such an embodiment is also particularly suitable for tightening a cutting ring or similar component for connection to the connector relative thereto in a sealed fashion.

According to the invention, a cutting ring is further provided and can be fixed on the hose nipple, wherein the union nut can be supported on said cutting ring, in particular, by means of the conically shaped collar. In comparison with the other components, the cutting ring may consist of a relatively soft metallic material such as, for example, copper. However, it would alternatively also be conceivable to realize the cutting ring in the form of a rubber seal. The most important function of the cutting ring consists of sealing the connection between the hose nipple and the connector. In this respect, it is particularly advantageous to manufacture the cutting ring of a soft material and to screw the cutting ring on the hose nipple. In this way, the soft material of the cutting ring effectively seals the transition between the hose nipple and the connector when the union nut is screwed to the connector.

According to another embodiment, it is proposed that the additional sleeve section of the union nut, i.e., the sleeve section that lies opposite the internal thread of the union nut, feature an annular groove. This annular groove can accommodate a ring seal that protects the connecting space between the connector and the hose nipple from dirt. This increases the service life of the entire hose fitting. The screw sleeve may alternatively or additionally also feature an annular groove with a ring seal.

According to another embodiment, it is proposed that the screw sleeve and the hose both be surrounded by an antikink spring in the transition area between the screw sleeve and the hose. In this case, the antikink spring is preferably realized in the form of a coil spring such that the individual spring windings lie on top of one another on the screw sleeve, i.e., they contact one another or at least nearly contact one another. The spacing between the individual spring windings may increase at the transition to the hose. Due to the antikink spring, mechanical stresses engaging on the hose as they are caused, for example, by a displacement or movement of the hose are springably absorbed. Consequently, mechanical forces can be better transmitted from the hose to the screw sleeve and the high-pressure hose can be better protected against kinking The antikink spring may also extend over the additional sleeve section of the union nut.

An exemplary embodiment of the invention is described in greater detail below with reference to the attached drawing.

BRIEF DESCRIPTION OF DRAWING

FIG. 1 shows a schematic sectional representation of an inventive connecting arrangement with a hose and a connector. The essential components of the connecting arrangement 1 are a hose nipple 2, a screw sleeve 3, as well as a union nut 4 and, if applicable, a cutting ring 5.

The figure shows the connecting arrangement 1 together with a high-pressure hose 6 and a connector 7 that can be connected in a sealed fashion to another component such as, for example, a pump or an inlet opening of a device by means of a screw thread.

The hose nipple 2 consists of an essentially sleeve-shaped component with a through-channel 8 for the medium transported in the hose 6. A section of the hose nipple 2 that is situated on the right side in the figure has a reduced outside diameter that is adapted to the inside diameter of the hose 6 in such a way that this section of the hose nipple 2 can be inserted into the hose 6. This section with a reduced outside diameter is followed by a threaded section that once again transforms into a connecting section that can be inserted into the connector 7.

The screw sleeve 3 extends over the hose 6 and the section of the hose nipple 2 accommodated therein in such a way that it encompasses the hose 6 from outside and is screwed onto the threaded section of the hose nipple 2.

The connecting section of the hose nipple 2 arranged on the left side in the figure is also provided with an external thread, onto which the cutting ring 5 is screwed. This cutting ring produces a seal relative to the connector 7 and simultaneously acts as a flange, on which the union nut 4 screwed to the connector 7 is supported.

For this purpose, the union nut 4 is equipped with a first sleeve section 9 (on the left side in the figure) that features an internal thread for connection to the connector 7, wherein this first sleeve section is followed by another sleeve section 10 with reduced outside diameter. A conical collar 11 in the form of an inwardly protruding flange, by means of which the union nut 4 is supported on the cutting ring 5, is provided between the two sleeve sections 9, 10 of the union nut 4. In this case, the additional sleeve section 10 encompasses the screw sleeve 3 and is supported thereon.

In the embodiment shown, a ring seal 12 is arranged between the additional sleeve section 10 of the union nut 4 and the screw sleeve 3, wherein said ring seal is accommodated in a groove 13 in the additional sleeve section 10. The ring seal 12 can protect the space surrounded by the union nut from dust. In addition, an antikink spring 14 is provided that respectively encloses the hose 6 and the screw sleeve 3 sectionally.

The individual connecting arrangement elements are successively arranged on the hose 6. According to one possible method for realizing the connecting arrangement 1, the antikink spring 14 is initially completely pushed onto the hose 6 and the hose nipple 2 is then inserted into the hose 6. The connection between the hose nipple 2 and the hose 6 is then secured by means of the screw sleeve 3. Subsequently, the antikink spring 14 is displaced in such a way that it sectionally encompasses the hose nipple 2.

The union nut 4 is attached to this sub arrangement. The cutting ring 5 is screwed onto the hose nipple 2 as the last element. In the present embodiment, the cutting ring 5 consists of a ductile metal and features an internal thread. The thusly realized connecting arrangement can be screwed to the external thread of the connector 7 with the internal thread of the first sleeve section 9. In this case, the collar 11 of the union nut 4 engages on the cutting ring 5. Since this cutting ring is rigidly connected to the hose nipple 2, a screw connection between the union nut 4 and the connector 7 results in the hose nipple 2 being displaced into the connector 7. In this way, a detachable fluidic connection between the connector and the hose is achieved, wherein forces acting upon the hose are transmitted into the connector 7 by means of the hose nipple 2, as well as the union nut 4.

List Of Reference Symbols
1 Connecting arrangement
2 Hose nipple
3 Screw sleeve
4 Union nut
5 Cutting ring
6 Hose
7 Connector
8 Channel
9 First sleeve section
10 Second sleeve section
11 Collar
12 Ring seal
13 Annular groove
14 Antikink spring

The invention claimed is:

1. A connecting arrangement for connecting a hose to a connector, said connecting arrangement comprising a hollow hose nipple that can be at least partially inserted into the hose, and a screw sleeve that is arranged on and in contact with the hose nipple and partially encompasses the hose, wherein the hose nipple is fluidically connected to the connector and can be connected to the connector by means of a union nut, wherein the union nut at least partially encompasses the screw sleeve, wherein the union nut comprises a first sleeve section with an internal thread for connection to the connector and with an inwardly directed collar for being supported on the hose nipple or an element connected thereto, and wherein the union nut comprises an additional sleeve section for encompassing the screw sleeve.

2. The connecting arrangement according to claim 1, wherein the collar of the union nut is conically tapered toward the inside.

3. The connecting arrangement according to claim 1 or 2, wherein the union nut comprises an annular groove, in which a ring seal is arranged, on the additional sleeve section.

4. The connecting arrangement according to claim 1, wherein a cutting ring, on which the union nut is supported, can be attached to the hose nipple.

5. The connecting arrangement according to claim 4, wherein the collar of the union nut is partially seated on the hose nipple and encompasses the cutting ring.

6. A connecting arrangement for connecting a hose to a connector, said connecting arrangement comprising a hollow hose nipple that can be at least partially inserted into the hose, and a screw sleeve that is arranged on and in contact with the hose nipple and partially encompasses the hose, wherein the hose nipple is fluidically connected to the connector and can be connected to the connector by means of a union nut having a collar, wherein the union nut at least partially encompasses the screw sleeve, wherein a cutting ring, on which the union nut is supported, can be attached to the hose nipple, and wherein the collar of the union nut is partially seated on the hose nipple and encompasses the cutting ring.

7. The connecting arrangement according to claim 1, 2, or 6, wherein the screw sleeve comprises an annular groove, in which a ring seal is arranged.

8. The connecting arrangement according to claim 1, 2, or 6, wherein an antikink spring surrounds a transition area from the screw sleeve to the hose.

\* \* \* \* \*